United States Patent [19]
Aoshima et al.

[11] Patent Number: 5,350,913
[45] Date of Patent: Sep. 27, 1994

[54] LIGHT PULSE INTENSITY REGENERATOR, LIGHT TRANFORMING REPEATER, PRE-AMPLIFIER FOR LIGHT SIGNAL, LIGHT INTENSITY CHANGE MEASURING APPARATUS, AND STABILIZED LIGHT SOURCE

[75] Inventors: Shinichiro Aoshima; Isuke Hirano, both of Hamamatsu, Japan

[73] Assignee: Hamamatsu Photonics K.K., Hamamatsu, Japan

[21] Appl. No.: 51,688

[22] Filed: Apr. 23, 1993

[30] Foreign Application Priority Data

Apr. 24, 1992 [JP] Japan .................. 4-106687

[51] Int. Cl.$^5$ ............................. G01J 1/32
[52] U.S. Cl. ..................... 250/205; 359/179
[58] Field of Search ......... 250/214 VT, 201.1, 214 A, 250/201.9, 205; 359/174-179

[56] References Cited

U.S. PATENT DOCUMENTS 4,958,231 9/1990 Tsuchiya ................ 250/214 VT
5,025,142 6/1991 Aoshima et al. ............. 250/201.9

*Primary Examiner*—David C. Nelms
*Attorney, Agent, or Firm*—Cushman, Darby & Cushman

[57] ABSTRACT

Input light incident into fiber end is separated by a light separator. Light traveling straight through the light separator is guided through an optical fiber to a light amplifying and deflecting section, where only components with deflection angle in a predetermined range are amplified and deflected then to be extracted. The extracted components are output as output light through an optical fiber. The other part of light separated by the light separator is received by a photo detector. The light received by the photo detector is converted into an electric signal, and the electric signal is then input into the light amplifying and deflecting section. Using the electric signal generated from the photo detector, desired wave shaping may be effected by adjusting a light amplification factor of the light amplifying and deflecting section, a change speed of deflection angle, and/or a range of deflection angle selected.

28 Claims, 17 Drawing Sheets

LIGHT PULSE INTENSITY REGENERATOR, LIGHT TRANFORMING REPEATER, PRE-AMPLIFIER FOR LIGHT SIGNAL, LIGHT INTENSITY CHANGE MEASURING APPARATUS, AND STABILIZED LIGHT SOURCE

BACKGROUND OF THE INVENTION

1. Field of the Invention

The present invention relates to a light pulse intensity regenerating apparatus enabling wave shaping.

2. Related Background Art

FIG. 1 is a drawing to show a construction of a conventional electro-optical streak camera in which a light control device for effecting light deflection is built (as disclosed in Japanese Laid-open (Kokai) Patent Application No. 1-287425). Signal light input into the device is split by a half mirror. Signal light traveling straight through the half mirror is amplified by a traveling wave amplifier (as will be referred to as TWA) then to enter a light deflector. The other signal light reflected by the half mirror is converted into an electric signal by a photoelectric tube, and the electric signal is used as a trigger signal for light deflector. Light output from the light deflector travels at an output angle according to sweep of the light deflector. The light is subjected to selected filtering through a slit, and the light through the slit is then detected by a detector.

There are other conventional techniques, for example, a waveform processor using a light amplifier (see U.S. Pat. No. 5,025,142), a semiconductor light amplifier (see References "Journal of Lightwave Technology, Vol. 6 No. 11, p1656–p1664, 1988" and "OPTICS, Vol. 18 No. 6, p297–p362, June 1989"), and a semiconductor light deflector (see Reference "Appl. Phys. Lett. 56 (14), p1299–p1301, 1990").

The conventional light controlling apparatuses do not serve as a wave shaping device. Specifically, the other light thus separated is merely used as a trigger, but is not used to effect deflection in accordance with a waveform of the separated light.

SUMMARY OF THE INVENTION

It is an object of the present invention to provide a light pulse intensity regenerating apparatus for performing pulse wave shaping in such a manner that only input signal light is input into the apparatus, a waveform of the input signal light is subjected to nonlinear amplification of light intensity and to deflection according to the light intensity, and only light traveling in a certain direction of deflection is output from the apparatus.

A light pulse intensity regenerating apparatus according to the present invention comprises (a) separating means for separating incident light into control light and shaping object light, (b) light detecting means for receiving the control light from the separating means to convert it into an electric signal having a value corresponding to a light amount of the received light, (c) a light amplifying section for amplifying an intensity of the shaping object light in accordance with an intensity of the electric signal output from the light detecting means, (d) a light deflecting section for deflecting the shaping object light having passed through the light amplifying section in accordance with the intensity of the electric signal output from the photo detecting means, and (e) light limiting means for permitting only light having a deflection angle within a predetermined range out of output light from the light deflecting section to pass therethrough.

The signal light input into the apparatus is first separated into the control light and the shaping object light by a light separator, which is a main component of the separating means, such that a ratio of intensity amplitude is constant at a time between the control light and the shaping object light. The light separator comprises a half mirror or a fiber coupler. The shaping object light is wave-shaped through amplification, deflection, and passing limitation at subsequent steps. The control light is used for controls of amplification and deflection effected on the shaping object light at the subsequent steps in the light amplifying section and in the light deflecting section while reflecting the waveform of light input into either the light amplifying section or the light deflecting section.

The control light separated by the separating means is input into the light detecting means. A photo detector, which is a main component of the light detecting means, outputs an electric signal reflecting (for example, proportional to) a light amount received. The photo detector comprises a photoelectric tube, a pin photodiode, or an avalanche photodiode. The electric signal output from the photo detector is input into the light amplifying section and into the light deflecting section to control an amplification factor and a deflection angle, respectively. An input timing of the electric signal into either of the light amplifying section and the light deflecting section is synchronized with a timing at which the shaping object light or the amplified shaping object light is passing through the light amplifying section or through the light deflecting section. Adjustment of the synchronization is effected by adjusting an optical path of optical fiber for shaping object light or for amplified shaping object light, or by adjusting a transfer delay time of electric signal. The electric signal output from the photo detector may be a current signal or a voltage signal, which may be selectively used in a suitable relation with control signal input circuits of the light amplifying section and the light deflecting section. In case that the photo detector outputs an electric signal of small value, the electric signal is guided through an electric amplifier then into the light amplifying section and into the light deflecting section.

The shaping object light separated by the separating means is input into the light amplifying section. A light amplifier, which is a main component of the light amplifying section, receives the electric signal output from the light detecting means and amplifies the shaping object light at an amplification factor in accordance with (for example in proportion to) a value of the electric signal. The input timing of the shaping object light is synchronized with the input timing of the control electric signal. For example, if the amplification factor is proportional to the value of control electric signal and if the value of control electric signal is proportional to the intensity of control light, the intensity of the amplified shaping object light would be proportional to a square of that of the shaping object light, which makes a rise and a fall in amplified shaping object light steeper. If n sets of light amplifiers are connected in series, a final intensity of amplified shaping object light would be proportional to the (n+1)-th power of that of shaping object light, further making a rise and a fall in amplified light steeper and steeper. A light amplifier having an amplification factor with saturation characteristics is effective for rectangular pulse formation. The light amplifier may be a semiconductor light amplifier (for example see T. Saito et al., Journal of Lightwave Technology, Vol. 6 No. 11, November 1988, p1656–1664) or a fiber amplifier.

The thus amplified shaping object light is input into the light deflecting section. A light deflector, which is a main component of the light deflecting section, receives the electric signal output from the light detecting means and provides the amplified shaping object light with a deflection angle in accordance with (for example in proportion to) a value of the electric signal. The input timing of amplified shaping object light is synchronized with the input timing of control electric signal. Thus, if the value of control electric signal is proportional to the intensity of control light, a deflection angle of amplified shaping object light would be proportional to the intensity of shaping object light. If n sets of light deflectors are connected in series, a final deflection angle of amplified shaping object light would additionally increase as to be n times as large as that in case of a set of light deflector arranged. Also, a light deflector having a deflection factor with saturation characteristics is effective for rectangular pulse formation. The light deflector may be for example a semiconductor light amplifier (see K. Tone et al., Appl. Phys. Lett. 56 (14), Apr. 2, 1990, p1229–1301).

The light output from the light deflecting section is input into the light limiting means. A light limiter, which is a main component of the light limiting means, comprises a slit or an optical fiber, which permits only light having a deflection angle within a predetermined range out of the output light from the light deflecting section to pass therethrough. Thus, the output light from the light limiting means includes only light obtained by amplifying the shaping object light into an intensity in a predetermined range and deflecting the amplified shaping object light into a deflection angle within the predetermined range, whereby the output light may include what is obtained by amplifying only light with desired intensity out of the input signal light. If the above light deflector has saturation characteristics, light having a waveform of rectangular pulse may be obtained. Also, a direct current component may be readily removed.

In the light pulse intensity regenerating apparatus according to the present invention as described, the amplification and the deflection of light are carried out in the light amplifying section and in the light deflecting section in accordance with the intensity of light itself, and the light limiting means permits only light having a deflection angle within a predetermined range to pass therethrough, whereby the output light may be obtained in such a waveform that signal components exceeding a certain threshold value are amplified with steeper rise and fall.

Using the light pulse intensity regenerating apparatus as a repeater in light communication system or as a pre-amplifier for light receiver, the S/N ratio may be improved and information may be transmitted at a high reliability. Additionally, incorporating the light pulse intensity regenerating apparatus according to the present invention into a light intensity change measuring apparatus, the intensity change of light may be measured while emphasized. Further, if a light source is controlled by feedback of the thus emphasized light intensity change thereinto, the light source may be stabilized to emit light with stable intensity.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

There will be the preferred embodiments according to the present invention described in detail with reference to the accompanying drawings.

Figure 1:
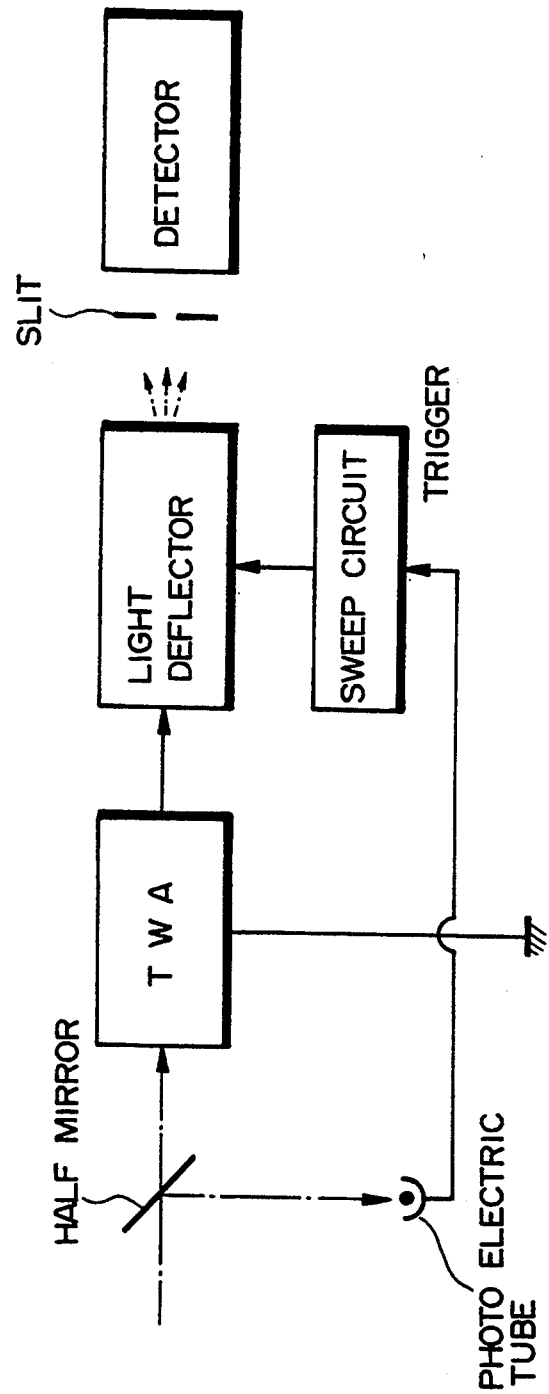
FIG. 1 is a drawing to show a conventional example of light control device.
Figure 2:
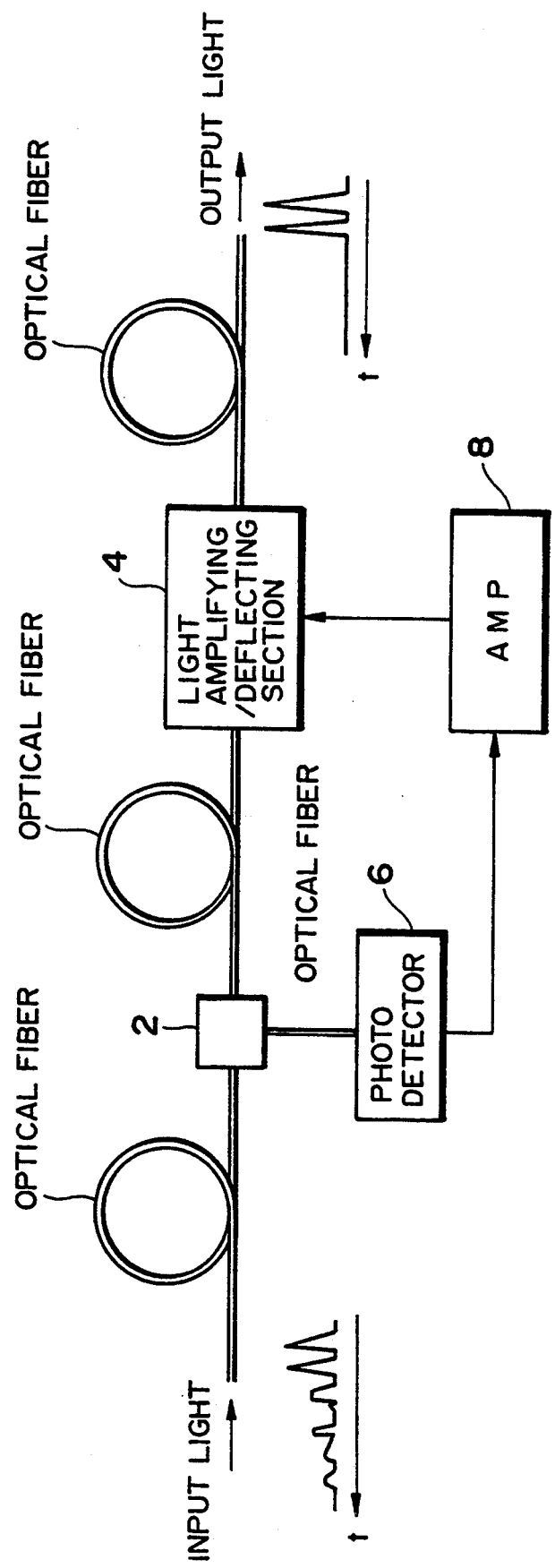
FIG. 2 is a drawing to show an embodiment of a light pulse intensity regenerator.

FIG. 2 is a drawing to show a construction of a light intensity nonlinear filter in a first embodiment. Input light incident into an end of fiber is separated by a beam splitter 2. Light traveling straight through the beam splitter 2 enters a light amplifying and deflecting section 4 through an optical fiber, in which the light is amplified and deflected, and through which a light component of predetermined deflection angle is extracted to be output from an optical fiber as output light. On the other hand, the other part of light separated by the beam splitter 2 is received by a photo detector 6. The light received by the photo detector 6 is converted into an electric signal therein, and the electric signal is amplified by an amplifier 8 then to be output to the light amplifying and deflecting section 4. Using the electric signal thus generated by the photo detector 6, desired wave shaping may be effected by adjusting a light amplification factor, a change speed of deflection angle, and/or a range of deflection angle selected, in the light amplifying and deflecting section 4.

Figure 3:
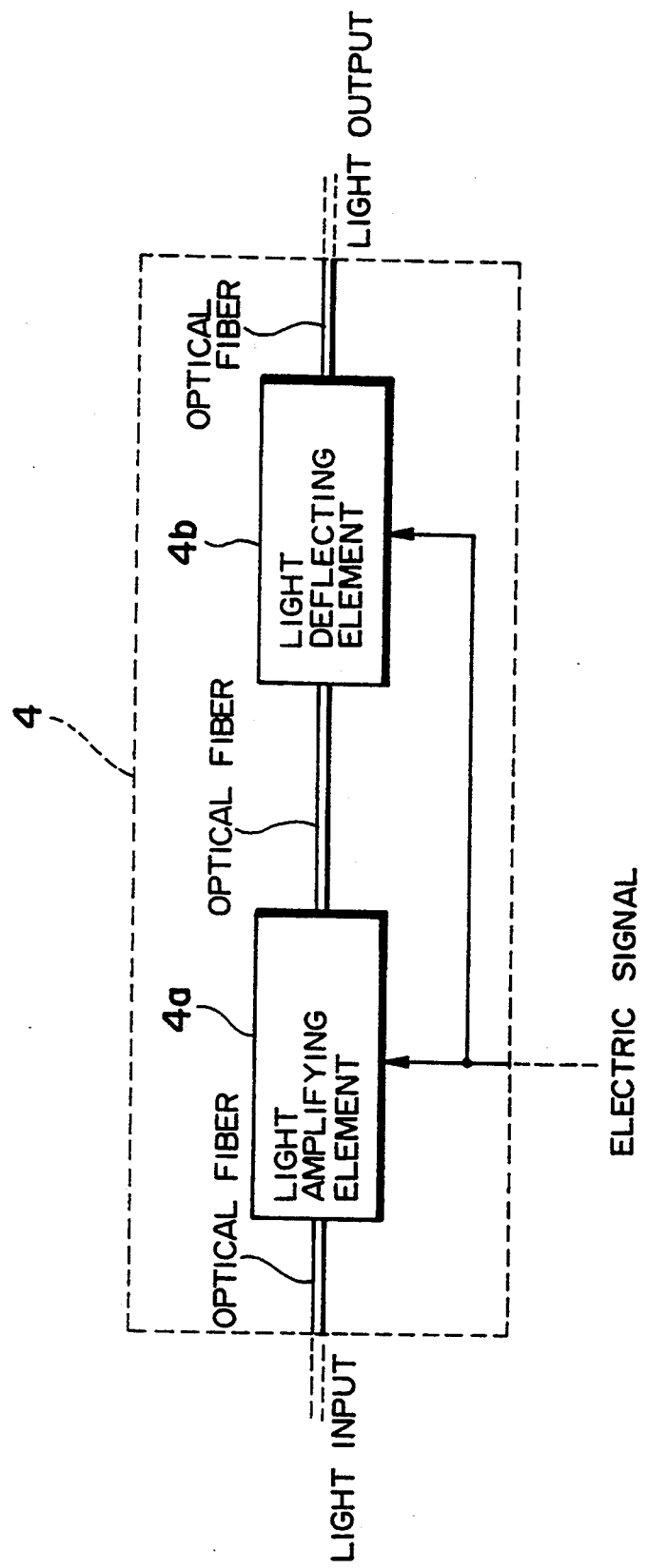
FIG. 3 is a drawing to show a construction of a light amplifying and deflecting section.

FIG. 3 shows a construction of the light amplifying and deflecting section 4. As shown in FIG. 3, the light amplifying and deflecting section 4 comprises a light amplifying element 4a and a light deflecting element 4b. In this arrangement a semiconductor light amplifier is used as the light amplifying element 4a, and a semiconductor light deflector as the light deflecting element 4b. The light amplifying element 4a and the light deflecting element 4b are so arranged that a light signal from the beam splitter 2 is synchronized in either of the elements with an electric signal from the photo detector 6.

In the above arrangement an optical fiber may be present or absent in connecting portion between the elements, or, the elements may be directly connected with each other, because they are both semiconductor elements. Further, the light amplifying and deflecting section 4 can be structured as an element which can simultaneously perform the light amplification and the light deflection with a single electric signal from the photo detector 6. Such a modification obviates separate application of electric signal in the arrangement of FIG. 3.

In addition to the semiconductor light amplifier, a rare earth doped amplifier may also be used as the light amplifying element 4a. Further, a galvanomirror as well as the semiconductor light deflector may also be used as the light deflecting element 4b. The light amplifying element 4a and the light deflecting element 4b are exchangeable in position. The elements 4a, 4b may be arranged to operate in accordance with at least one of electric current amount and voltage strength of the electric signal output from the photo detector 6. It would be preferable in respect of simplification of amplification of electric signal and distribution of signal that the elements 4a, 4b both be operated with a single signal (for example a current).

Figure 4:
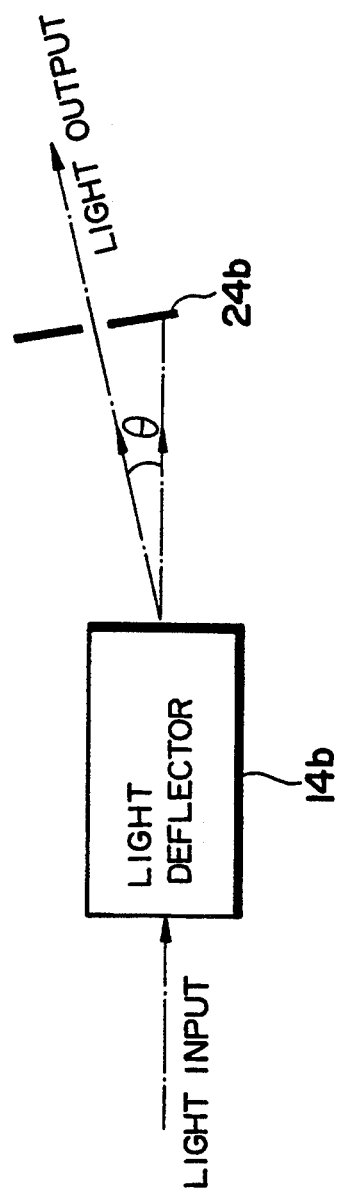
FIG. 4 is a drawing to show a construction of a light deflecting element.

FIG. 4 shows a construction of the light deflecting element 4b. As shown in FIG. 4, the light deflecting element 4b comprises a light deflector 14b, for example a semiconductor light deflector, and a light limiting member 24b. The light limiting member 24b may be a member with an equivalent aperture of fiber end or a member using a normal slit. The light input into the light deflector 14b is output therefrom at a certain deflection angle in accordance with the electric signal output from the photo detector 6. Since the light limiting member 24b is present in this arrangement, output light may include components with angle near a deflection angle $\theta$.

There will be described in detail fundamentals of operation of the light intensity nonlinear filter as shown in FIG. 2, with reference to FIG. 5 to FIG. 14.

Figure 5:
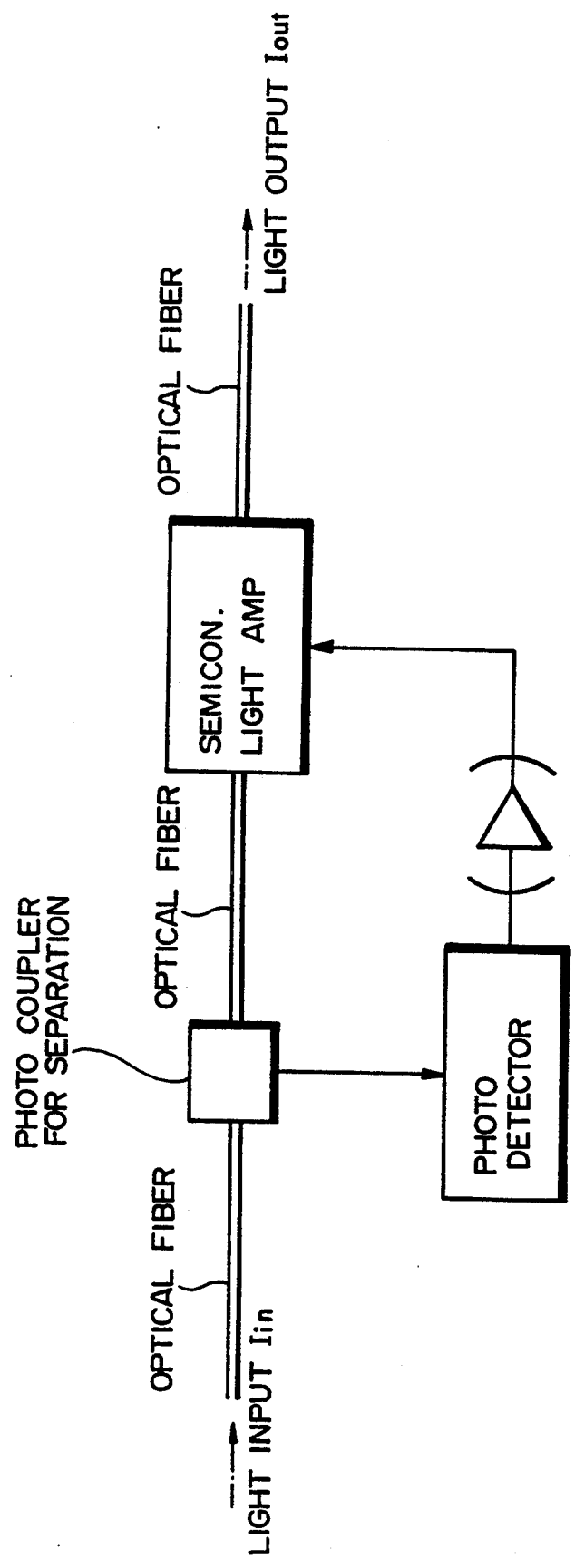
FIG. 5 is a drawing to show a test system for evaluating characteristics of a semiconductor light amplifier.
Figure 6:
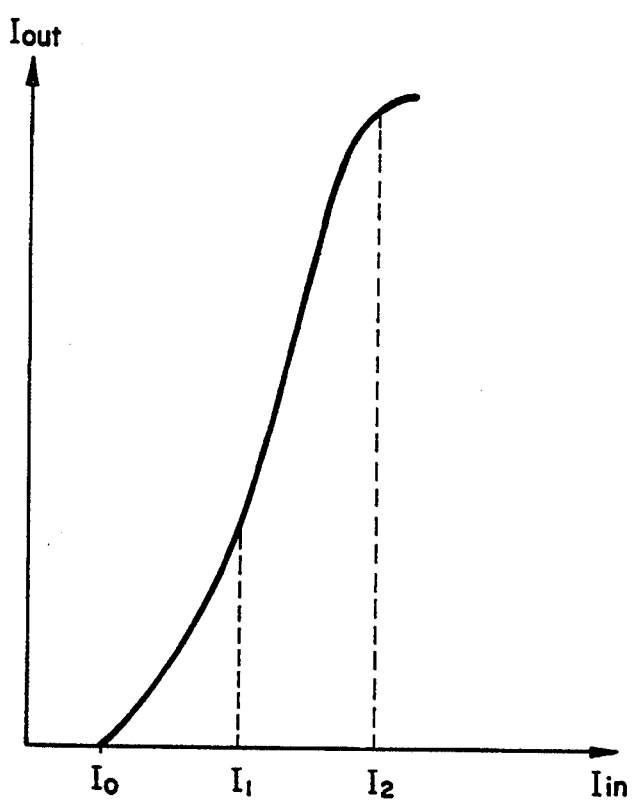
FIG. 6 is a drawing to show characteristics of the semiconductor light amplifier.

FIG. 5 shows a test system for evaluating characteristics of the semiconductor light amplifier constituting the light amplifying element 4a. Such evaluation of characteristics is carried out to determine wave shaping characteristics of the light intensity nonlinear filter of the embodiment. FIG. 6 shows characteristics of the semiconductor light amplifier obtained using the apparatus of FIG. 5.

In FIG. 6, if the input light intensity $I_{in}$ satisfies the condition of $I_{in} < I_0$, then $I_{out} = 0$ because of an increase of loss.

If the intensity $I_{in}$ satisfies the condition of $I_0 \leq I_{in} < I_2$, then $I_{out} \sim k(I_{in} - I_0)^2$ where k is a proportional constant. In case that $I_0 \leq I_{in} < I_1$, then $I_{in} < I_{out}$, which means that no light amplification is carried out. In contrast, in case that $I_1 \leq I_{in} < I_2$, then $I_{out} \geq I_{in}$, which means that the light amplification is carried out.

If the intensity $I_{in}$ satisfies the condition of $I_2 \leq I_{in}$, then $I_{out} \sim k(I_2 - I_0)^2$ = constant.

Figure 7:
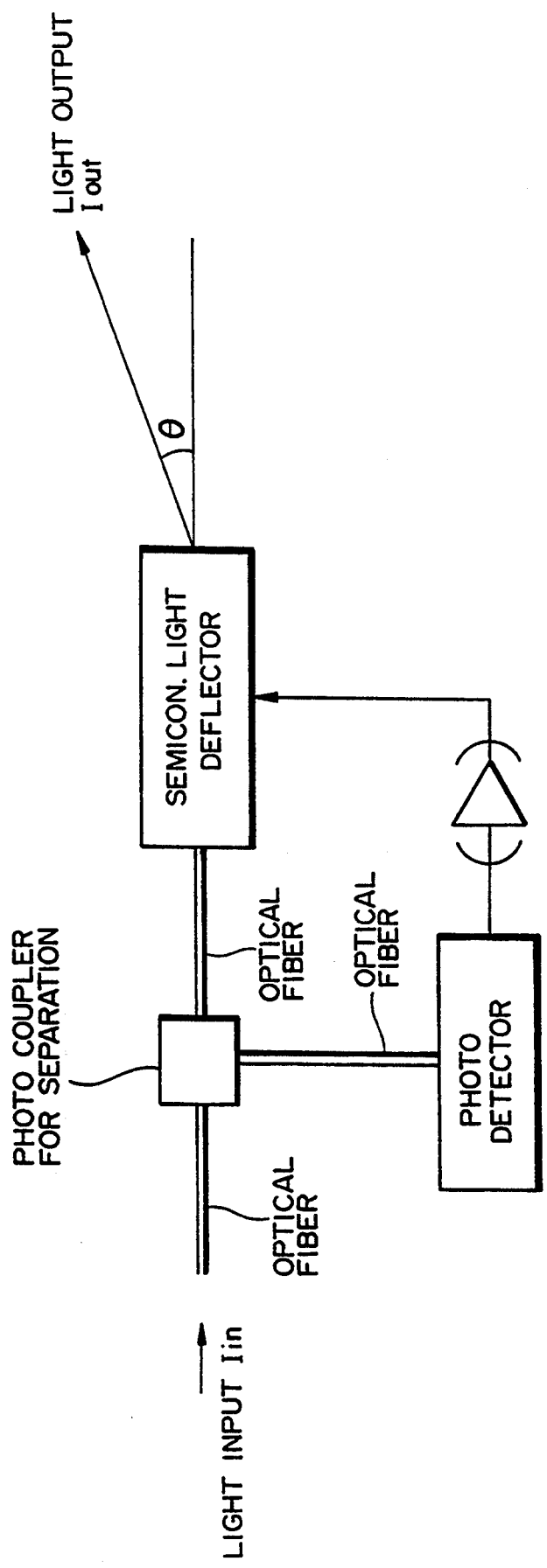
FIG. 7 is a drawing to show a test system for evaluating characteristics of a semiconductor light deflector.
Figure 8:
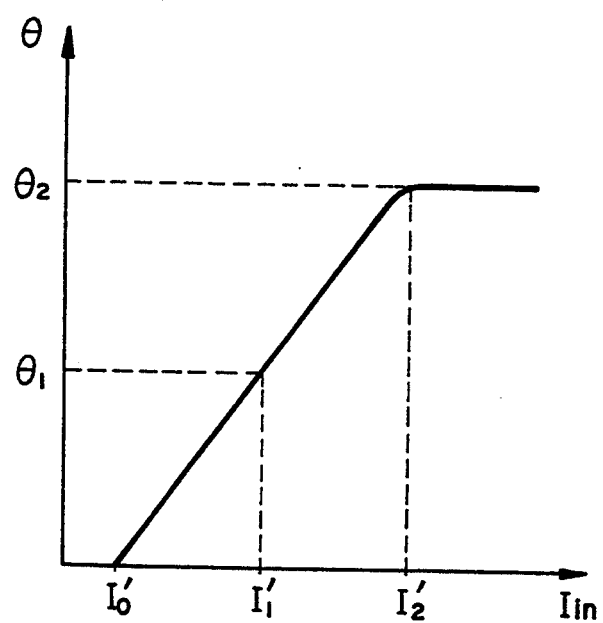
FIG. 8 is a drawing to show characteristics of the semiconductor light deflector.

FIG. 7 shows a test system for evaluating characteristics of the semiconductor light deflector constituting the light deflecting element 4b. Such evaluation of characteristics is carried out to determine the wave shaping characteristics of the light pulse intensity regenerator of the embodiment. FIG. 8 shows characteristics of the semiconductor light deflector obtained using the apparatus of FIG. 7.

In FIG. 8, if the input light intensity $I_{in}$ satisfies the condition of $I_{in} < I_0'$, then $\theta = 0$ because of an increase of loss. If the intensity $I_{in}$ satisfies the condition of $I_0' \leq I_{in} < I_2'$, then $\theta_{out} \sim k'(I_{in} - I_0')$ where k' is a proportional constant. Further, if the intensity $I_{in}$ satisfies the condition of $I_2' \leq I_{in}$, then $\theta_{out} \sim k'(I_2' - I_0')$ = constant.

Figure 9:
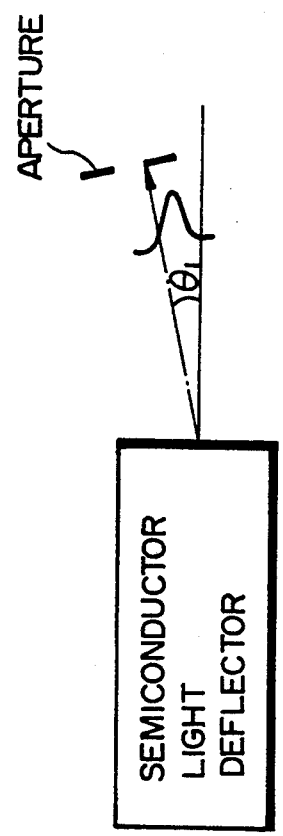
FIG. 9 and FIG. 10 are drawings to show a test system for evaluating characteristics of a light deflecting element.
Figure 10:
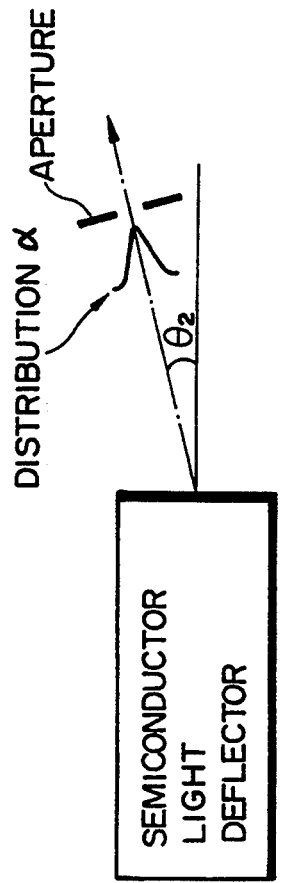

FIG. 9 and FIG. 10 show a test system for evaluating characteristics of the light deflecting element which is a combination of the semiconductor light deflector of FIG. 7 with an aperture. Such evaluation of characteristics is carried out to determine the wave shaping characteristics of the light intensity nonlinear filter of the embodiment.

Figure 11:
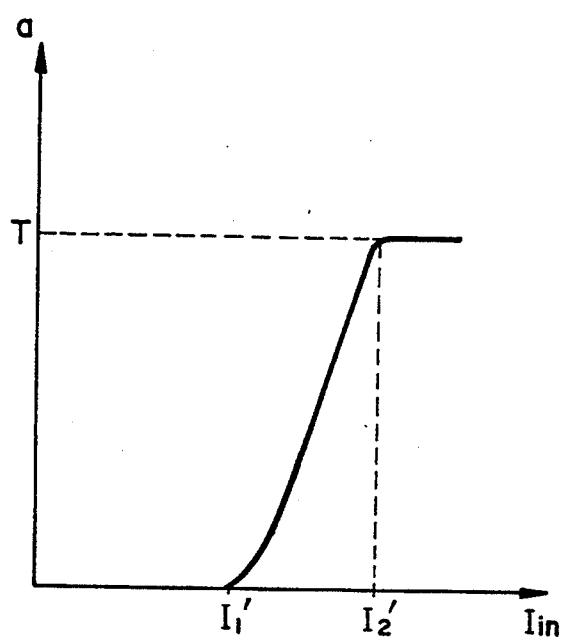
FIG. 11 is a drawing to show characteristics of the light deflecting element.

In case that the output light from the semiconductor light deflector has a distribution $\alpha$ of spatial intensity as shown in FIG. 9 and FIG. 10, and if the aperture is located with center at angle $\theta_2$ behind the semiconductor light deflector, the output light with output angle $\theta_2$ may be most efficiently transmitted through the aperture. Further, if the input-output characteristics are determined such that the output light starts passing through the aperture when the distribution tail of the distribution $\alpha$ reaches angle $\theta_1$ as shown in Fig. 10, the output characteristics a of the light deflecting element would be as shown in FIG. 11.

If the output light from the semiconductor light deflector has the distribution $\alpha$, the output characteristics a of the light deflecting element would show a difference in curvature of one point from another in $I_1' \leq I_{in} \leq I_2'$. For simplification, the following description is based on an approximation that the light deflecting element has such output characteristics within this range of $I_{in}$ that $a = k''(I_{in} - I_1')$ where k'' is a proportional constant. Then, if $I_1' \leq I_{in} \leq I_2'$, the following relation exists between a light input intensity $I_{in}$ and a light output intensity $I_{out}$ in the light deflecting element.

$$I_{out} = aI_{in}$$
$$= k''(I_{in} - I_1') \cdot I_{in}$$

The light amplifying element and the light deflecting element were separately explained in the above description. They are connected with each other in series as adjusted in characteristics of the elements to have the following separation ratio of the photo coupler and amplification factor of the amplifier:

$$I_1' = k(I_1 - I_0)_2;$$

$$I_2' = k(I_2 - I_0)^2.$$

Figure 12:
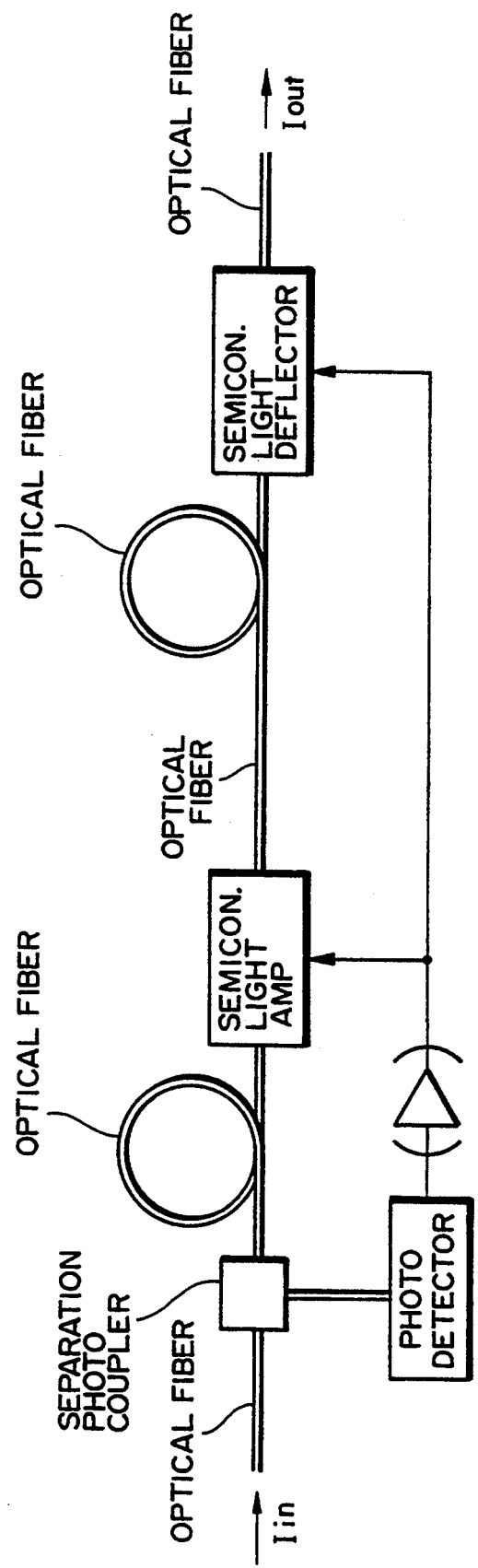
FIG. 12 is a drawing to show a test system for evaluating characteristics of a combination of semiconductor light amplifier with light deflecting element.
Figure 13:
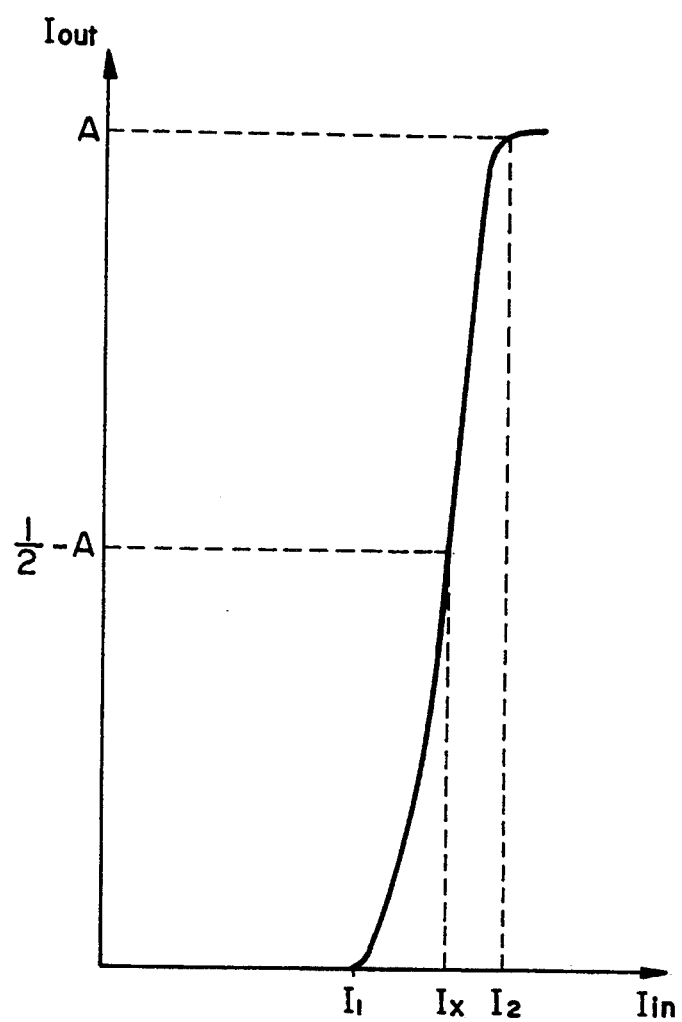
FIG. 13 is a drawing to show characteristics of the apparatus as shown in FIG. 12.

FIG. 12 shows a combination of the light amplifying element of FIG. 5 with the light deflecting element of FIG. 7 on the above conditions, in which the aperture is an end face of optical fiber. FIG. 13 shows input-output characteristics of the apparatus of FIG. 12.

In this arrangement, in $I_1 \leq I_{in} \leq I_2$, $$\begin{aligned} I_{out} &= k''\{k(I_{in} - I_0)^2 - k(I_1 - I_0)^2\} \cdot I_{in} \\ &= k'' \cdot k\{(I_{in} - I_0)^2 - (I_1 - I_0)^2\} \cdot I_{in}. \end{aligned}$$

Substituting $C = k'' \cdot k$ and $I_0 = 0$ since $I_0 < I_1$, $$I_{out} \sim C \cdot (I_{in}^2 - I_1^2) \cdot I_{in}.$$

AS apparent from this equation, $I_{out}$ is a cubic function of $I_{in}$, which has a threshold value at $I_{in} = I_1$ and which has a quick rise in $I_1 \leq I_{in} \leq I_2$. In other words, using the apparatus as shown in FIG. 12, a nonlinear filter may be constructed with a quick rise in $I_1 \leq I_{in} \leq I_2$ as enabling light amplification.

Figure 14:
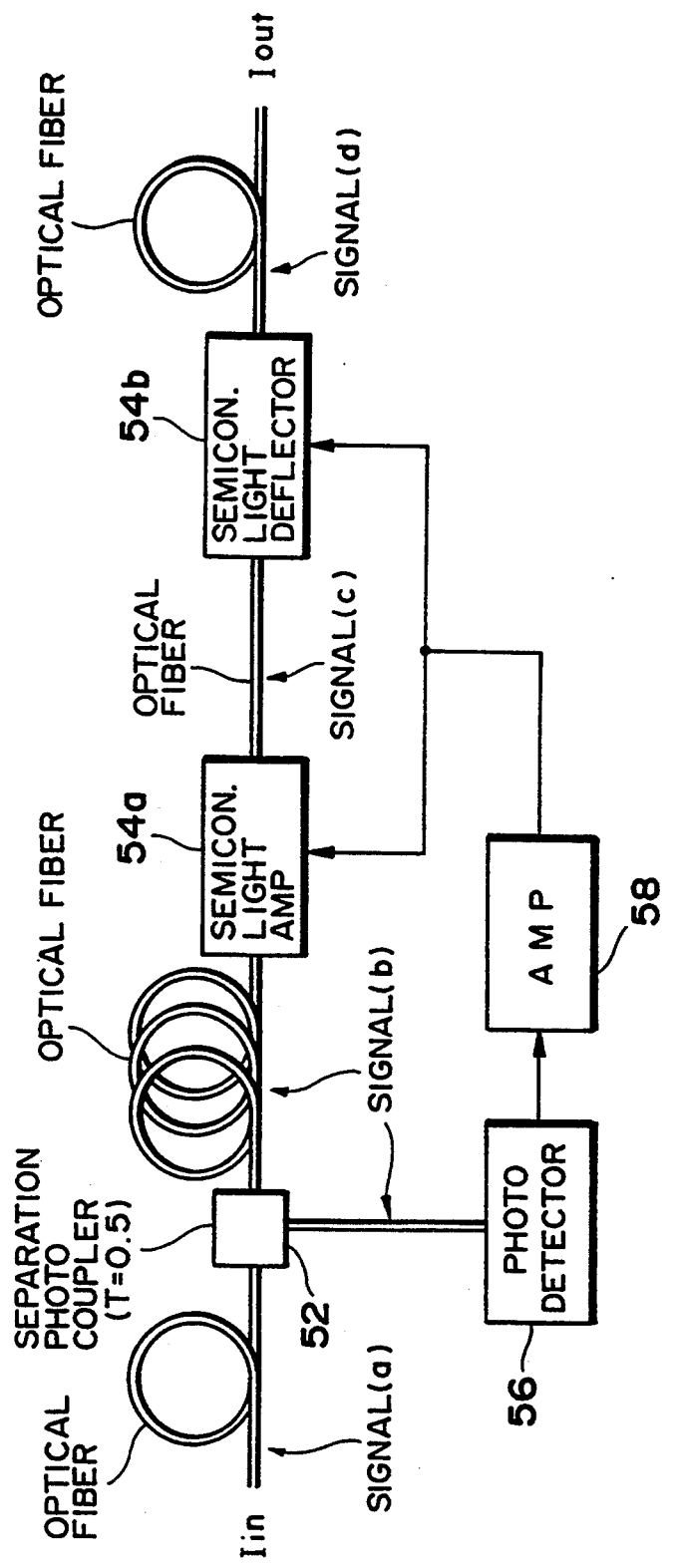
FIG. 14 is a drawing to show a specific apparatus as an embodiment of the apparatus of FIG. 13.

FIG. 14 shows a construction of a specific apparatus actually arranged in correspondence to the apparatus of FIG. 12. Light traveling straight through a separation photo coupler 52 enters a semiconductor light amplifier 54a to be amplified therein. The thus amplified light is deflected by a semiconductor light deflector 54b. An end of optical fiber is connected to an output end of the semiconductor light deflector 54b as aligned at a suitable angle, whereby components with deflection angle in a predetermined range are extracted from the output light and output from the optical fiber. The other part of light separated by the separation photo coupler 52 is received by a photo detector 54. The light received by the photo detector 54 is converted into an electric signal, and thereafter is amplified by an amplifier 58 to be then input into the semiconductor light amplifier 54a and into the semiconductor light deflector 54b.

The following description concerns the examination of light waveform at each of selected portions when an input light waveform is a superposition of sinusoidal wave on direct current light into the apparatus of FIG. 14, based on the fundamentals of operation in the apparatus of FIG. 12. Different from the apparatus of FIG. 12, an electric signal from a single photo detector 56 is separated into two, and the separate signals are input into the semiconductor light amplifier 54a and into the semiconductor light deflector 54b, respectively, in this apparatus. It is, however, assumed that the input-output characteristics of the apparatus of FIG. 12 can be applied to this case without modification. It is further assumed that $I_0 = 0$.

Figure 15:
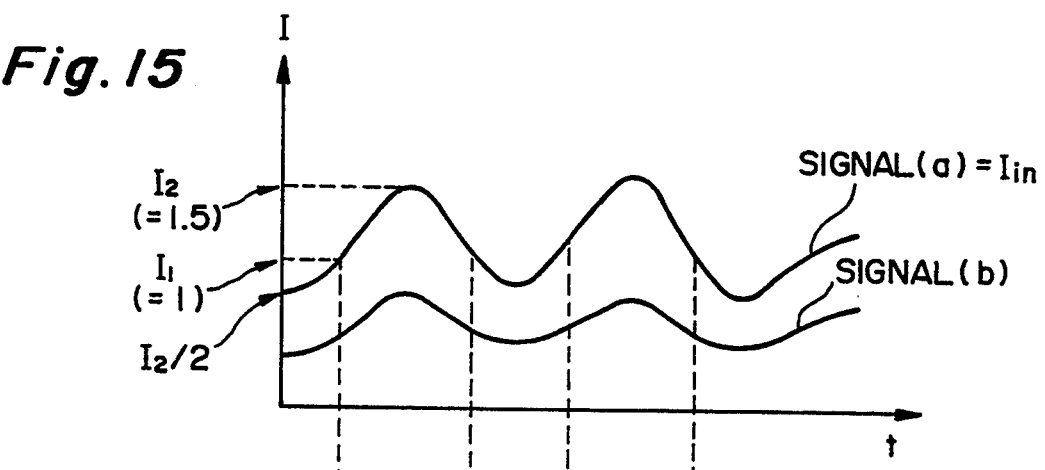
FIG. 15 and FIG. 16 are drawings to show operations of the apparatus of FIG. 14.
Figure 16:
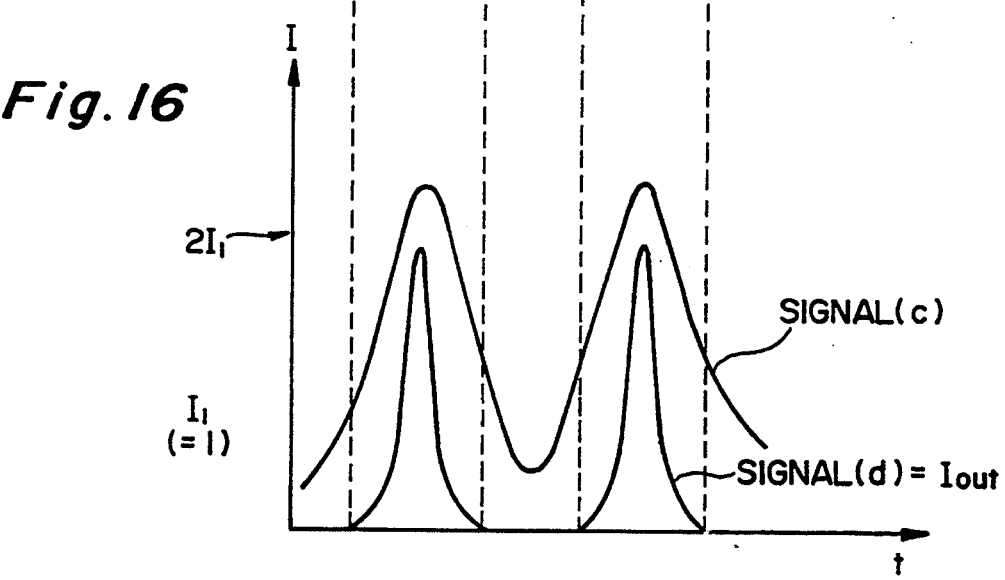

FIG. 15 and FIG. 16 are drawings to show waveforms at selected portions in the apparatus of FIG. 14.

Signal (a) is a waveform to show a time change of input light $I_{in}$. Signal (b) is a waveform to show a time change of input light into the semiconductor light amplifier 54a after separated.

Signal (c) is a waveform to show a time change of output light from the semiconductor light amplifier 54a after separated. Since the light amplification may be effected with $I_1 \leq I_{in}$ and then when $I_1 = I_{in}$, $$I_{out} = I_1 = k \cdot I_1^2.$$

Supposing $I_1 = 1$, then $k = 1$. The calculation in the following description is carried out under the conditions of $I_1 = 1$ and $k = 1$ for brevity. If $I_2 = 1.5$, then $I_{out} = 1 \cdot 1.5^2 = 2.25$.

Signal (d) is a waveform to show a time change of output light ($I_{out}$) from the semiconductor light deflector 54b. Setting $k'' = 1$, $C = k \cdot k'' = 1$. Then, $$I_{out} = (I_{in}^2 - I_1^2) \cdot I_{in}.$$

When $I_{in} = I_1 (= 1)$, $I_{out} = 0$. When $I_{in} = I_2 (= 1.5)$, $I_{out} = 1.875$.

As seen from the above description, the output light may be finally obtained as removing the direct current component, emphasizing the modulation components, and amplifying the peak intensity. The separation ratio of the separation photo coupler 52 may be made variable in this case. Also, the amplification factor of the semiconductor light amplifier 54a may be made variable. Further, using the semiconductor light amplifier 54a and the semiconductor light deflector 54b having saturation characteristics in light amplification, the light from the light separating means may be nonlinearly deflected using the saturation characteristics.

There will be described examples of application of the light pulse intensity regenerating apparatus as described.

Figure 17:
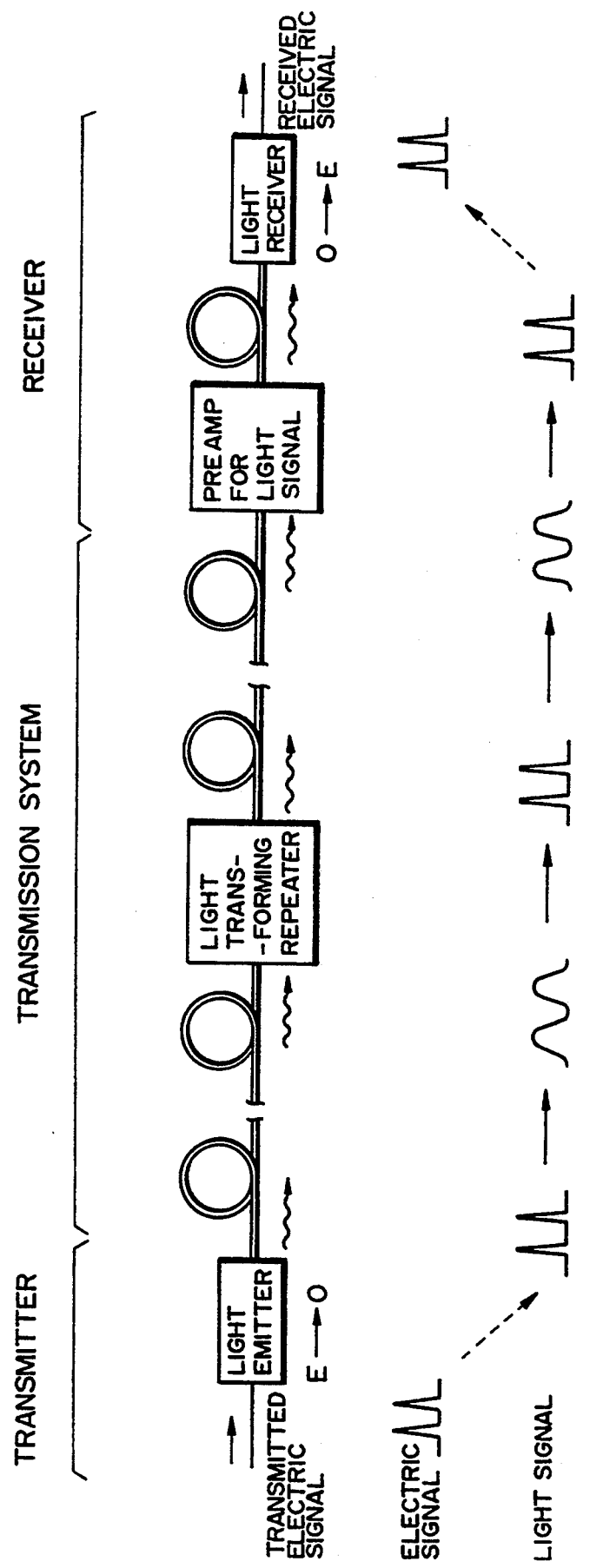
FIG. 17 is a drawing to show applications of the light pulse intensity regenerating apparatus according to the present invention as a light transforming repeater and as a light signal pre-amplifier.

FIG. 17 shows a light communication system in which a light communication repeater and a light signal pre-amplifier are positioned.

(1) Application as light communication repeater

If a desired light signal is set to have a slightly higher intensity than $I_2$, a signal may be obtained in such conditions that only the desired light signal is amplified with uniform intensity because of the saturation of the elements and that optical noises caused for example by scattering are absorbed (that the optical noises are inhibited from being output). (Reference should be made to the waveforms of input and output light in FIG. 2). Then, the repeater has a feature of steep rise in light pulse signal.

(2) Application as light signal pre-amplifier

If the light pulse intensity regenerating apparatus is placed in front of a photo detector, the signal may be received at a higher S/N ratio in judging on or off at a light receiver. This will be described in more detail below.

For example, a receiving side photo detector and a judgement circuit are set to judge on when $I_{out} \geq \frac{1}{2} \cdot C \cdot (I_2^2 - I_1^2) \cdot I_2$ while off when $I_{out} < \frac{1}{2} \cdot C \cdot (I_2^2 - I_1^2) \cdot I_2$. Let $I_{in}$ resulting in $I_{out} = \frac{1}{2} \cdot C \cdot (I_2^2 - I_1^2) \cdot I_2$ be $I_x$. Then, it is easy to make a range of input light intensity for judging on, $\Delta I = |I_x - I_2|$, approximately equal to $I_2/10$. In other words, it can be avoided that noises from scattering or the like are erroneously judged as on signal, and the signal components in $\Delta I$ are detected after amplified.

(3) Light intensity change measuring apparatus

Figure 18:
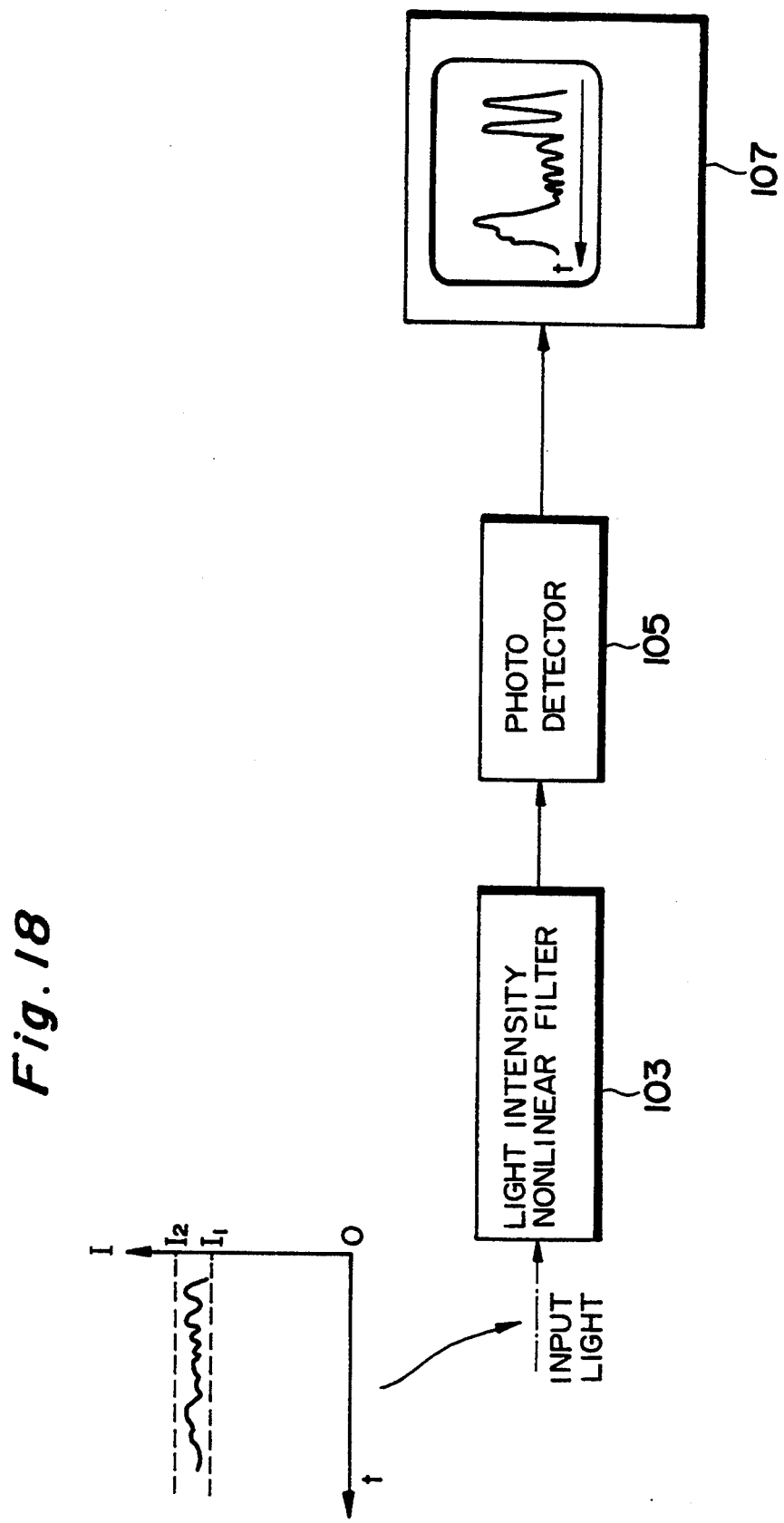
FIG. 18 is a drawing to show an embodiment of a light intensity change measuring apparatus.

FIG. 18 is a drawing to show an embodiment of light intensity change measuring apparatus. The intensity of input light slightly varies as shown. The input light passes through a pulse intensity regenerating apparatus 103 similar to that in FIG. 2, and is then detected by a photo detector 105. An output of the photo detector 105 is detected by a monitor 107 such as an oscilloscope. Then, the waveform of input light with slight intensity change in $I_x \sim I_2$ may be observed as enlarged.

(4) Stabilized light source

Figure 19:
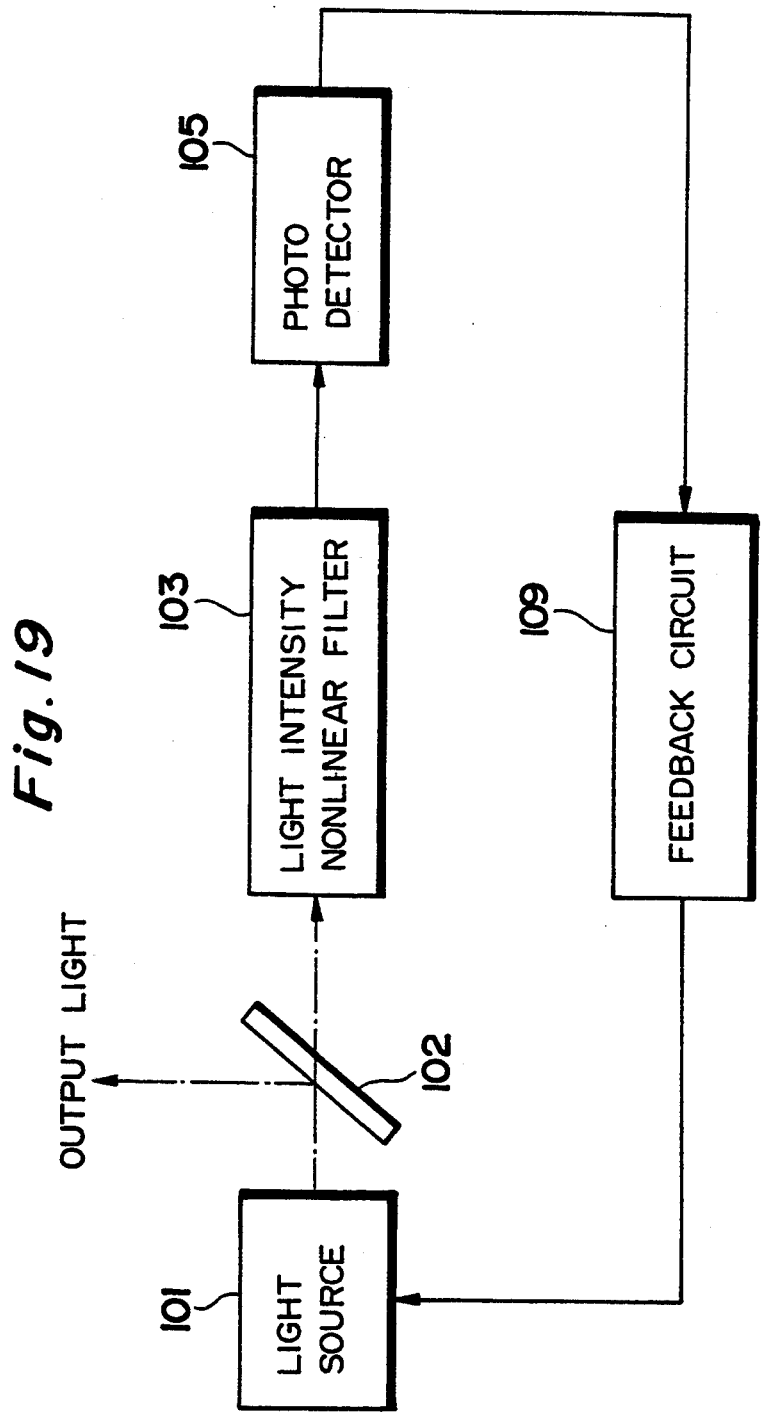
FIG. 19 is a drawing to show an embodiment of a stabilized light source.

FIG. 19 is a drawing to show an embodiment of stabilized light source. Light emitted from a variable light source 101 is separated by a light separator 102 into two beams. One of the two separate beams is output to the outside of the system as output light of the stabilized light source. The other beam of the two separate beams is guided through a light pulse intensity regenerating apparatus 103 similar to that in FIG. 2, and is then detected by a photo detector 105. An electric signal output of the photo detector 105 is input into a feedback circuit 109. The feedback circuit 109 compares the intensity of the thus input electric signal with a reference electric signal intensity which is preliminarily set at an intensity of electric signal obtained when the light source 101 emits light with a certain intensity, to detect a difference therebetween, and outputs an electric signal indicating emission of light with an intensity which can compensate the difference. The variable light source 101 changes the intensity of emission light in accordance with a change in value of the electric signal output from the feedback circuit 109. The emission light amount of the light source 101 is thus stabilized, providing a stabilized light source which can provide output light with stable intensity to the outside. The intensity of output light is determined by adjusting the reference electric signal intensity in the feedback circuit 109.

It should be noted that the present invention is not limited to the embodiments as described. For example, multiple sets of light pulse intensity regenerating apparatuses as shown in FIG. 2 may be connected in series in order to emphasize the effects thereof. Also, the light pulse intensity regenerating apparatus may be coupled with a saturable absorbing element.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A light pulse intensity regenerating apparatus comprising:

separating means for separating incident light into a first beam and a second beam;

light detecting means for receiving said first beam from said separating means;

a light amplifying section for amplifying the second beam from said separating means in accordance with an amplitude of an electric signal output from said light detecting means;

a light deflecting section for deflecting the second beam in accordance with an amplitude of an electric signal output from said light detecting means; and light limiting means for permitting only light having a deflection angle within a predetermined range out of output light from said light deflecting section to pass therethrough;

wherein control timings of said light amplifying section and of said light deflection section are adjusted with the electric signal from said light detecting means such that an amplification amount in said light amplifying section and a deflection amount in said light deflecting section reflect an intensity of light passing through said light amplifying section and an intensity of light through said light deflecting sections respectively.

2. A light pulse intensity regenerating apparatus according to claim 1, wherein there is provided with a light amplifying and deflecting device capable of simultaneously carrying out a light amplification operation of said light amplifying section and a light deflection operation of said light deflecting section.

3. A light pulse intensity regenerating apparatus according to claim 1, wherein said separating means comprises a half mirror having a fixed separation ratio.

4. A light pulse intensity regenerating apparatus according to claim 1, wherein said separating means comprises a photo coupler having a fixed separation ratio.

5. A light pulse intensity regenerating apparatus according to claim 1, wherein said separating means is arranged to comprise a photo coupler made of a material having an electro-optical effect in which a separation ratio is variable according to a value of applied voltage.

6. A light pulse intensity regenerating apparatus according to claim 1, wherein said light detecting means comprises a photo detector which outputs an electric signal in accordance with an amount of received light.

7. A light pulse intensity regenerating apparatus according to claim 5, wherein said electric signal is either one of an electric current signal and a voltage signal.

8. A light pulse intensity regenerating apparatus according to claim 1, wherein said light detecting means comprises a photo detector and an amplifier for amplifying an electric signal output from the photo detector.

9. A light pulse intensity regenerating apparatus according to claim 8, wherein said electric signal is either one of an electric current signal and a voltage signal.

10. A light pulse intensity regenerating apparatus according to claim 1, wherein said light amplifying section comprises a light amplifier composed of a semiconductor laser element and an antireflection coating applied on either end face of said semiconductor laser element, and wherein the amplification factor is variable in accordance with an electric signal input from the outside.

11. A light pulse intensity regenerating apparatus according to claim 1, wherein said light amplifying section comprises a fiber light amplifier using a rare earth doped fiber in which the amplification factor is variable in accordance with an electric signal input from the outside.

12. A light pulse intensity regenerating apparatus according to claim 1, wherein said light deflecting section comprises a light deflector composed of a light deflecting element made of a material of semiconductor which changes an index of refraction by carrier induction.

13. A light pulse intensity regenerating apparatus according to claim 1, wherein said light deflecting section comprises a light deflector composed of a galvanomirror.

14. A light pulse intensity regenerating apparatus according to claim 1, wherein said light amplifying section has saturation characteristics in amplification factor of input light.

15. A light pulse intensity regenerating apparatus according to claim 1, wherein said light deflecting section has saturation characteristics in deflection angle amount of input light.

16. A light pulse intensity regenerating apparatus according to claim 1, wherein said light amplifying section comprises multiple sets of light amplifiers connected in series with each other.

17. A light pulse intensity regenerating apparatus according to claim 1, wherein said light deflecting section comprises multiple sets of light deflectors connected in series with each other.

18. A light pulse intensity regenerating apparatus according to claim 1, wherein said light limiting means is a slit vertically disposed at a predetermined deflection angle.

19. A light pulse intensity regenerating apparatus according to claim 1, wherein said light limiting means is an optical fiber vertically disposed with an end face thereof at a predetermined deflection angle.

20. A light transforming repeater comprising a light pulse intensity regenerating apparatus as set forth in claim 1 used between optical fibers in optical fiber communication system.

21. A pre-amplifier for light signal comprising a light pulse intensity regenerating apparatus as set forth in claim 1 used between optical fibers in optical fiber communication system.

22. A light intensity change measuring apparatus comprising:
 a light pulse intensity regenerating apparatus as set forth in claim 1 for receiving light to be measured;
 a photo detector for receiving light output from said light pulse intensity regenerating apparatus and then converting the received light into an electric signal corresponding to an amount of the received light; and
 a measuring device for measuring the electric signal output from said photo detector.

23. A light intensity change measuring apparatus according to claim 22, wherein said photo detector comprises either one of a photoelectric tube, a pin photodiode, and an avalanche diode as a light detecting element.

24. A light intensity change measuring apparatus according to claim 22, wherein said measuring device is an oscilloscope.

25. A stabilized light source system comprising:
 a non-stabilized light source controllable in amount of light emission with an external electric signal;
 a light separator for separating light emitted from said non-stabilized light source into two beams;
 a light pulse intensity regenerating apparatus as set forth in claim 1, into which one of said two separate beams is input;
 a photo detector for receiving light output from said light pulse intensity regenerating apparatus and converting the light received into an electric signal corresponding to an amount of the light received; and
 a feedback circuit for receiving the electric signal output from said photo detector to produce an electric signal for controlling the amount of light emission of said non-stabilized light source;
 wherein the other of said two separate beams separated by said light separator is output as output light.

26. A stabilized light source system according to claim 25, wherein said light separator is either one of a half mirror and an optical fiber coupler.

27. A stabilized light source system according to claim 25, wherein said photo detector comprises either one of a photoelectric tube, a pin photodiode, and an avalanche photodiode as a light detecting element.

28. A stabilized light source system according to claim 25, wherein said feedback circuit detects a difference between a value of input electric signal and a predetermined value of electric signal and outputs an electric signal of value for compensating a change in light emission amount of said non-stabilized light source necessary for canceling the difference.

* * * * *